(12) United States Patent
Parker

(10) Patent No.: US 7,287,172 B2
(45) Date of Patent: *Oct. 23, 2007

(54) SYSTEM AND METHOD FOR LOCKING USER INPUT ELEMENTS FOR SMALL COMPUTER DEVICES

(75) Inventor: Kathryn L. Parker, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

This patent is subject to a terminal disclaimer.

(21) Appl. No.: 11/051,223

(22) Filed: Feb. 4, 2005

(65) Prior Publication Data

US 2005/0132180 A1 Jun. 16, 2005

Related U.S. Application Data

(63) Continuation of application No. 09/740,908, filed on Dec. 19, 2000, now Pat. No. 6,874,094.

(51) Int. Cl.
G06F 1/32 (2006.01)

(52) U.S. Cl. ........................ 713/310; 713/324

(58) Field of Classification Search ................ 713/320, 713/310, 324

See application file for complete search history.

(56) References Cited

U.S. PATENT DOCUMENTS

| | | | |
|---|---|---|---|
| 4,179,733 A | 12/1979 | Lauzel et al. ............... | 713/202 |
| 5,241,583 A | 8/1993 | Martensson ................. | 455/565 |
| 5,526,422 A | 6/1996 | Keen .......................... | 379/396 |
| 5,617,572 A | 4/1997 | Pearce et al. ............... | 713/323 |
| 5,664,097 A | 9/1997 | Johnson et al. ............. | 713/200 |
| 5,805,084 A | 9/1998 | Mannisto .................... | 321/22 |
| 5,973,676 A * | 10/1999 | Kawakura ................... | 345/173 |
| 6,208,876 B1 | 3/2001 | Raussi et al. ............... | 455/557 |
| 6,422,145 B1 | 7/2002 | Gavrilovic et al. ......... | 102/200 |
| 6,457,132 B1 | 9/2002 | Borgendale et al. ........ | 713/320 |
| 6,874,094 B2 * | 3/2005 | Parker ........................ | 713/310 |

* cited by examiner

Primary Examiner—Chun Cao
(74) Attorney, Agent, or Firm—Merchant & Gould P.C.

(57) ABSTRACT

A system and method for automatically locking user interface input elements to avoid negative impact of inadvertently pressing a user input element. The method receives an internally generated locking signal; sets a locked flag to indicate the user input elements are locked. Input signals occurring while the input elements are locked are ignored. In accordance with other aspects, the method further relates to determining whether input signals relate to an unlock signal. The internally generated locking signal is generated following a predetermined time interval that is managed by an internal timer and may be related to an automatic shutoff/sleep mode time interval. Alternatively, a calendar-type application program may initiate the internally generated locking signal in response to a predetermined event.

19 Claims, 3 Drawing Sheets

SYSTEM AND METHOD FOR LOCKING USER INPUT ELEMENTS FOR SMALL COMPUTER DEVICES

RELATED APPLICATION

This application is a continuation of prior U.S. patent application Ser. No. 09/740,908, entitled "System and Method for Locking User Input Elements for Small Computer Devices" filed Dec. 19, 2000 now U.S. Pat. No. 6,874,094, which is hereby incorporated herein by reference in its entirety.

TECHNICAL FIELD

The present invention relates to small, portable computing devices, and particularly to small, portable computing devices that have user input elements such as touch screens and buttons. More particularly, the invention relates to small computing devices having an automatic shut-off feature and/or a sleep mode.

BACKGROUND OF THE INVENTION

Small, handheld computing devices have been steadily growing in popularity in recent years. The devices are known by different names, such as palmtops, pocket computers, personal digital assistants, personal organizers, H/PCs, or the like. These devices, hereinafter "small computer devices," provide much of the same functionality as their larger counterparts. In particular, the small computer devices provide users the ability to perform word processing, task management, spreadsheet processing, address book functions and Internet browsing, as well as many other functions.

Typically, the small computer devices have limited battery lives and therefore power conservation is an important design consideration. Therefore, most small computer devices incorporate an automatic shutoff/sleep module that automatically places the device in a power-saving sleep mode after a predetermined time of inactivity, i.e., the lack of user input. Although the device is in sleep mode, low-level computing functions may occur, such as the operations of an internal clock and/or an internal calendar type application which function to provide user notifications of scheduled events. When such a reminder is presented to the user, the device turns on or "wakes up" and displays a message. If no user input occurs, the device returns to sleep mode after a predetermined time interval.

Since these devices are highly portable, the devices tend to be placed or carried in brief cases, tote bags or other crowded environments such that the probability of inadvertently pressing an input element is relatively high. Unfortunately, these inadvertent presses may pose significant problems for users of the small devices, e.g., problems relating to power consumption, connection fees for the Internet, etc. As an example, if a device is automatically turned on, e.g., when a reminder-type notification occurs, while the device is in a tote bag, inadvertent presses may cause the device to remain on, i.e., the device is not allowed to automatically shutoff after the predetermined timeout period. Consequently, if the device cannot shut off, power is consumed unnecessarily.

Other devices, such as cellular phones, have a button lock feature which allows the user to lock the input elements. The cellular phones are placed in a locked mode by manually entering a combination of button presses. Once locked, the device ignores further input signals, except for input signals for unlocking the cellular phone. The button lock feature is only used when the device is on, however, and the user must manually place the device in locked mode by activating the method that locks the user input elements. The added responsibility of having the user manually placing the device in a locked mode increases the probability that the device will not be in locked mode when needed.

It is with respect to these considerations and others that the present invention has been made.

SUMMARY OF THE INVENTION

The present invention relates to a system and method for locking user interface input elements to avoid negative impact of inadvertently pressing an input element. Additionally, the system and method relate to automatically locking the user interface input elements. The method comprises the acts of receiving an internally generated locking signal; setting a locked flag to indicate the user input elements are locked; and ignoring input signals when the locked flag is set. In accordance with other aspects, the method further relates to determining whether input signals relate to an unlock signal. If input signals do not relate to an unlock signal, ignore the input signal, otherwise, if input signals relate to an unlock signal, unlocking the user input elements. Moreover, a display message may be displayed to aid the user in determining whether the user interface elements are locked.

In accordance with still other aspects, the present invention involves a small computer device that has a timer. The internally generated locking signal is generated following a predetermined time interval that is managed by the timer. The predetermined time interval may also be related to an automatic shutoff/sleep mode time interval.

In yet another embodiment the small computer device has a calendar-type application program and the internally generated locking signal is generated by the calendar-type application program in response to a predetermined event. The small computer device may also have a timer used to automatically place the device in sleep mode after a predetermined period of time. When the device awakes from sleep mode in response to a reminder that occurs during sleep mode, user input signals are ignored to allow the device to return to sleep mode following a predetermined period of time.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, to the following detail description of presently preferred embodiments of the invention, and to the appended claims.

DETAILED DESCRIPTION OF THE INVENTION

An embodiment of the invention provides the ability to lock user interface or input elements for a small computer device. The system remains locked until the user unlocks the system using a predetermined combination of hardware button presses. Moreover, the system is allowed to go into sleep mode while the user interface elements are locked. Additionally, the system may be configured to automatically lock user input elements in response to a combination of one or more hardware button presses, activating an application, or in response to a locking signal generated by an internal mechanism or module.

Figure 1:
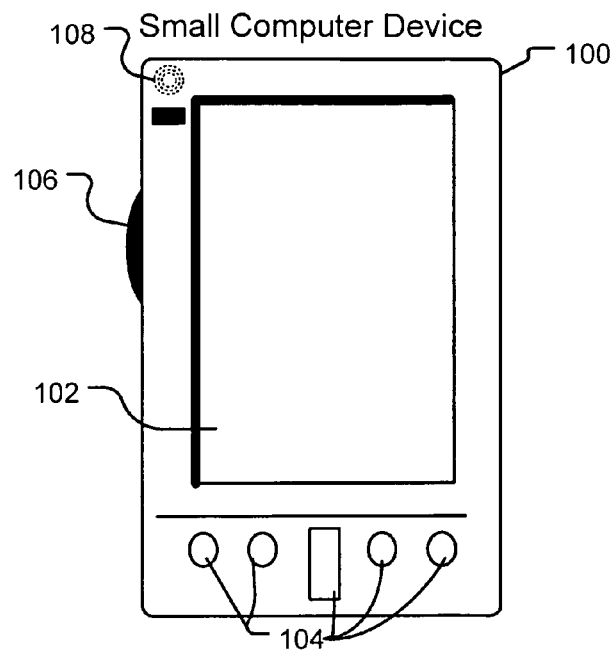
FIG. 1 depicts a handheld computer incorporating the present invention.

A computing device 100 having a touch screen display 102 and input buttons 104 and 106 which enable a user to enter information into the computer 100 in accordance with aspects of one embodiment of the present invention is shown in FIG. 1. The device 100 is a small computing device, such as handheld or palm-sized personal computer described in the Background Section above. In addition to the user input buttons 104 and 106, the small computer device 100 has a speaker 108 which provides sound signals to the user.

In alternative embodiments, the invention could be used in combination with any number of other computer systems or environments, such as in desktop environments, laptop or notebook computer systems, multiprocessor systems, microprocessor based or programmable consumer electronics, network PCs, mini computers, main frame computers and the like. The invention may also be practiced in distributed computing environments where tasks are performed by remote processing devices that are linked through a communications network in a distributed computing environment, programs may be located in both local and remote memory storage devices. In essence, any computer system having user input elements may incorporate aspects of this invention.

Figure 2:
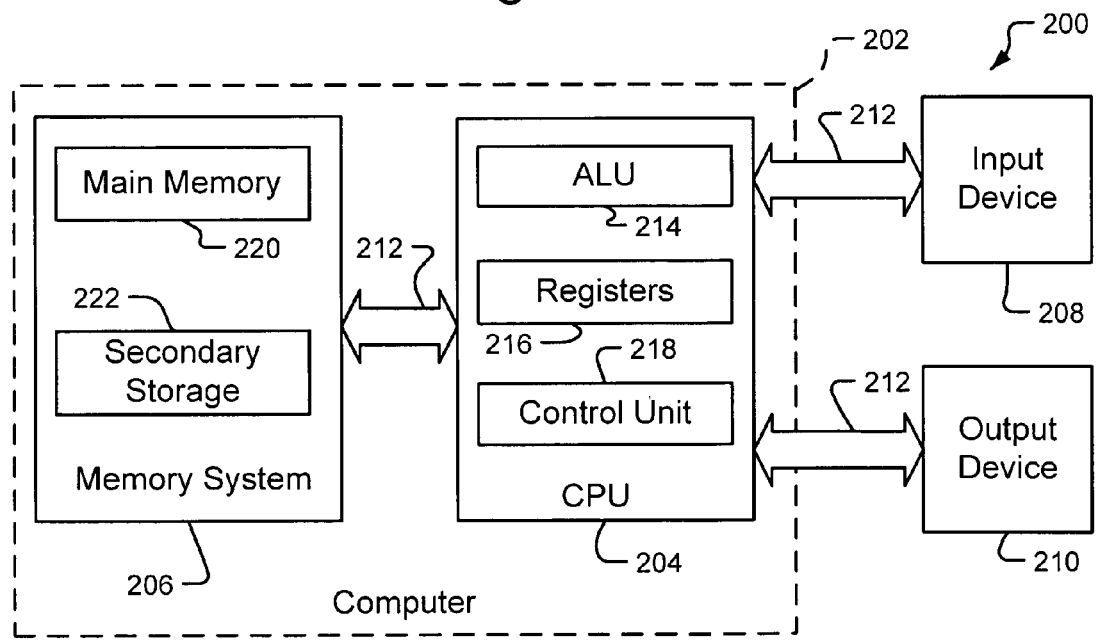
FIG. 2 is block diagram of a computer used in an embodiment of the present invention, such as the computer shown in FIG. 1.

The computer 100 (shown in FIG. 1) incorporates a system 200 of resources for implementing an embodiment of the invention, as shown in FIG. 2. The system 200 incorporates a computer 202 having at least one central processing unit (CPU) 204, a memory system 206, an input device 208, and an output device 210. These elements are coupled by at least one system bus 212.

The CPU 204 is of familiar design and includes an Arithmetic Logic Unit (ALU) 214 for performing computations, a collection of registers 216 for temporary storage of data and instructions, and a control unit 218 for controlling operation of the system 200. The CPU 204 may be a microprocessor having any of a variety of architectures including, but not limited to those architectures currently produced by Intel, Cyrix, AMD, IBM and Motorola.

The system memory 206 comprises a main memory 220, in the form of media such as random access memory (RAM) and read only memory (ROM), and may incorporate or be adapted to connect to secondary storage 222 in the form of long term storage mediums such as hard disks, floppy disks, tape, compact disks (CDs), flash memory, etc. and other devices that store data using electrical, magnetic, optical or other recording media. The main memory 220 may also comprise video display memory for displaying images through the output device 210, such as a display screen. The memory can comprise a variety of alternative components having a variety of storage capacities such as magnetic cassettes, memory cards, video digital disks, Bernoulli cartridges, random access memories, read only memories and the like may also be used in the exemplary operating environment. Memory devices within the memory system and their associated computer readable media provide nonvolatile storage of computer readable instructions, data structures, programs and other data for the computer system.

The system bus 212 may be any of several types of bus structures such as a memory bus, a peripheral bus or a local bus using any of a variety of bus architectures.

The input and output devices are also familiar. The input devices 208 can comprise a small keyboard, a touch pad, a touch screen 102, etc. The output devices 210 can comprise a display, such as display 102 (FIG. 1), a printer (not shown), speaker 108, etc. Some devices, such as a network interface or a modem can be used as input and/or output devices. The input and output devices 208 and 210 are connected to the computer through system buses 212 as shown in FIG. 2.

The computer system 200 further comprises an operating system and usually one or more application programs. The operating system comprises a set of programs that control the operation of the system 200, control the allocation of resources, provide a graphical user interface to the user, facilitate access to local or remote information, and may also include certain utility programs such as the email system. An application program is software that runs on top of the operating system software and uses computer resources made available through the operating system to perform application specific tasks desired by the user. In general, an application is responsible for generating displays and locking the user interface input elements in accordance with the present invention, but the invention may be integrated into the operating system, as part of the control panel, for example. Exemplary operating systems in which the locking application may complement or be integrated with include Microsoft Corporation's Windows for Pocket PC, also known as Windows CE, operating system.

Computing device 100 typically includes at least some form of computer readable media. Computer readable media can be any available media that can be accessed by 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
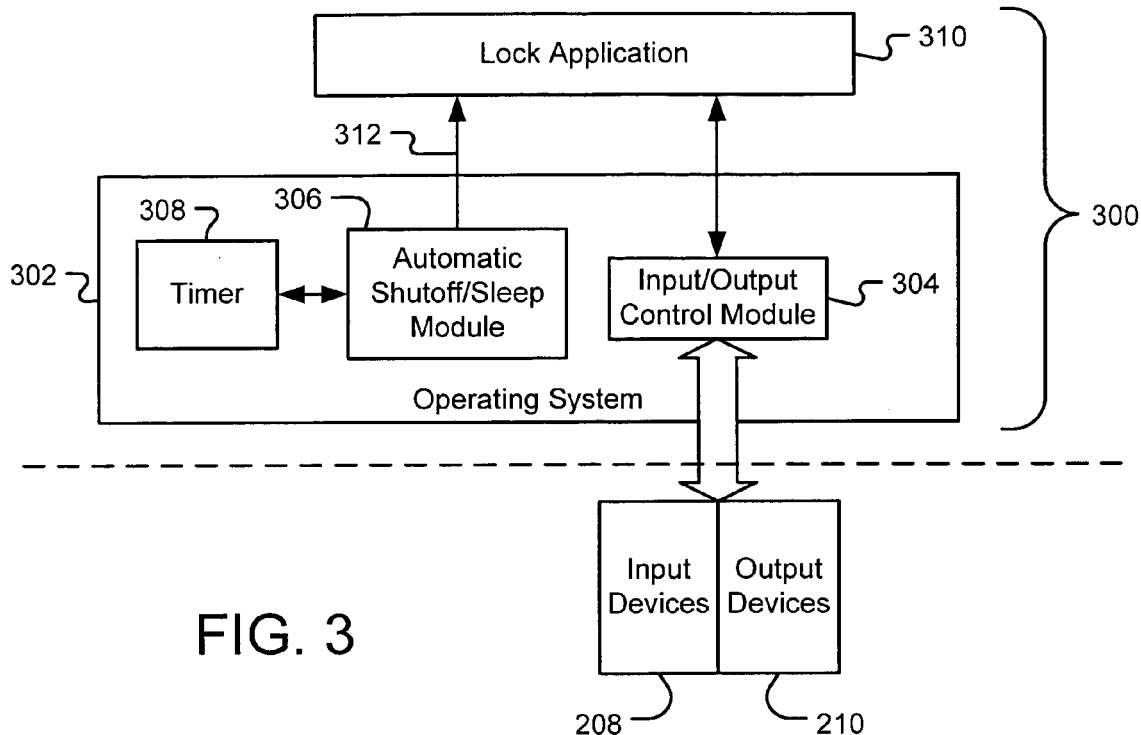
FIG. 3 is a block diagram depicting a software environment in an embodiment of the invention.

An exemplary software environment 300 that incorporates aspects of the present invention is shown in FIG. 3. Operating system 302 manages input and output elements 208 and 210 through an input/output control module 304. The input/output control module 304 recognizes user input from the various input elements, such as the touch screen 102 and the input buttons 104 and 106 shown in FIG. 1. Additionally, the input/output control module 304 conducts necessary signals to provide output information to the user through such output elements as the touch screen 102 and the speaker 108.

The operating system 302 also has an automatic shutoff/sleep module 306 that automatically places the small computer device into sleep mode after a predetermined time interval has elapsed. In order to evaluate whether the predetermined time interval has elapsed, the automatic shutoff/sleep module 306 communicates with timer 308. The duration of the predetermined time interval is typically set by the user and may be as short as a couple of seconds but may be set to a longer interval. The time interval is restarted when an input signal is recognized by the system 302. Thus, the device does not go into sleep mode as long as input signals are received during the predetermined time period since the timer is reset each time an input signal is recognized by the system.

The operating system 302 operates in conjunction with a lock application 310 which is used to lock the input elements. Locking the input elements relates to internally ignoring inadvertent input signals received from the input elements, such as the touch screen 102 and the buttons 104 and 106. That is, the user may still press the control buttons 104 and touch the touch screen 102 causing input signals to be received by the input/output control module 304. However, when the input elements are locked, the signals are ignored and not recognized as input signals and hence no input-type actions are taken. Importantly, the timer is not reset when one of these input signals is received but not recognized. Thus, while the input elements are locked, the device is allowed to automatically enter sleep mode, even if the user purposely or inadvertently is using the input elements to enter input signals.

The lock application 310 receives lock signals from the input/output control module 304. Typically a user executes predetermined input actions to cause such a locking signal to be conducted to the lock module. Alternatively however, as evidenced by arrow 312, the lock application 310 may receive a lock signal from another, internal module, such as module 306, as discussed in more detail below.

Figure 4:
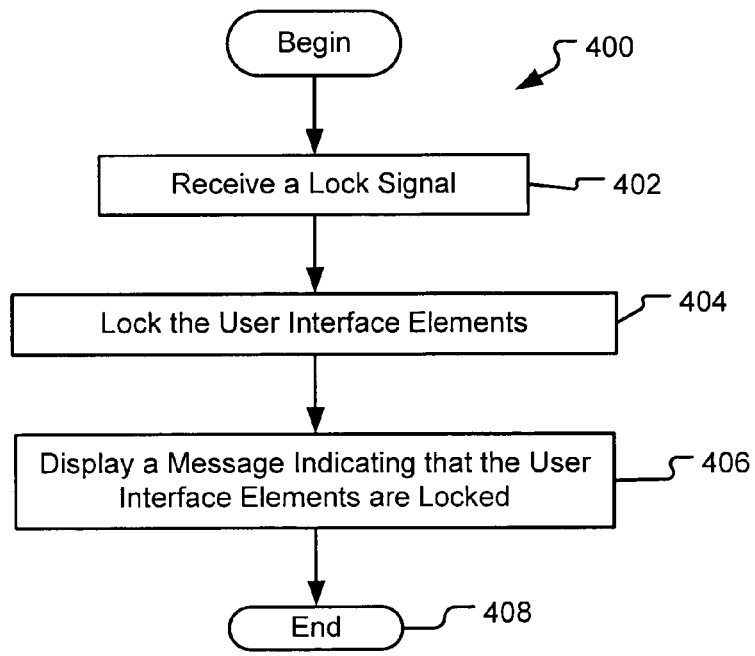
FIG. 4 is a flow diagram showing the operational characteristics of locking the input elements of the computer system shown in FIG. 1.

FIG. 4 is a flow chart of the operational characteristics of the present invention related to locking the input elements. Flow 400 begins as receive operation 402 receives an input signal indicating that the input elements should be locked. Receive operation is similar to a receive operation wherein the device simply acknowledges that input signals have been conducted to the device and passes these input signal to the next module for processing. The difference however, is that receive operation 402 receives the specific input signal or signals related to locking the input elements.

The actual input signals that can trigger the locking of the user input elements are varied. That is, the device may be configured so that the user may enter a lock command by selecting a predetermined icon on the display or be selecting a predetermined menu option. Moreover, the device may be configured so that a single button press or a predetermined combination of button presses indicates that the user input elements should be locked.

In an alternative embodiment, the device may receive a locking signal automatically, i.e., without explicit user input. For example, the device may be configured so that an internally generated locking signal is conducted to the lock application 310 when the system enters sleep mode. Alternatively, the device may be configured to automatically lock at a predetermined time interval following the most recent user input, wherein the predetermined time interval is equal to or longer than the time interval used to put the device into sleep mode. In yet another alternative embodiment, the user may utilize a calendar-type application to cause the input elements to be locked at predetermined times, based on predetermined events. In essence, since the lock application 310 simply requires an indication that the user input elements are to be locked, such an indication may be delivered in many different ways, including but not limited to, user input and internally or system generated signals.

Following the receipt of a locking signal, lock operation 404 locks the user interface elements. Locking the user interface elements involves setting a flag or a bit to provide an internal indication that the user interface elements are locked. Once the elements are locked, the system ignores future input signals, unless those signals unlock the user input element. Since the input signals are ignored the device is allowed to enter sleep mode following a predetermined time period.

Once the user interface elements are locked, display operation 406 displays a message indicating that the user interface elements are locked. As an example, the screen display may display a message that states "Input Buttons Are Locked" or "Device is Locked" or any other message. Alternatively, an LED may turn on or change color to indicate that the input elements are locked. Such a display may not be used in alternative embodiments, however, users may appreciate the display so that when trying to use the device, they are reminded to unlock the user interface elements. Once display operation 406 displays an indication that the input elements are locked, the flow ends at operation 408.

Figure 5:
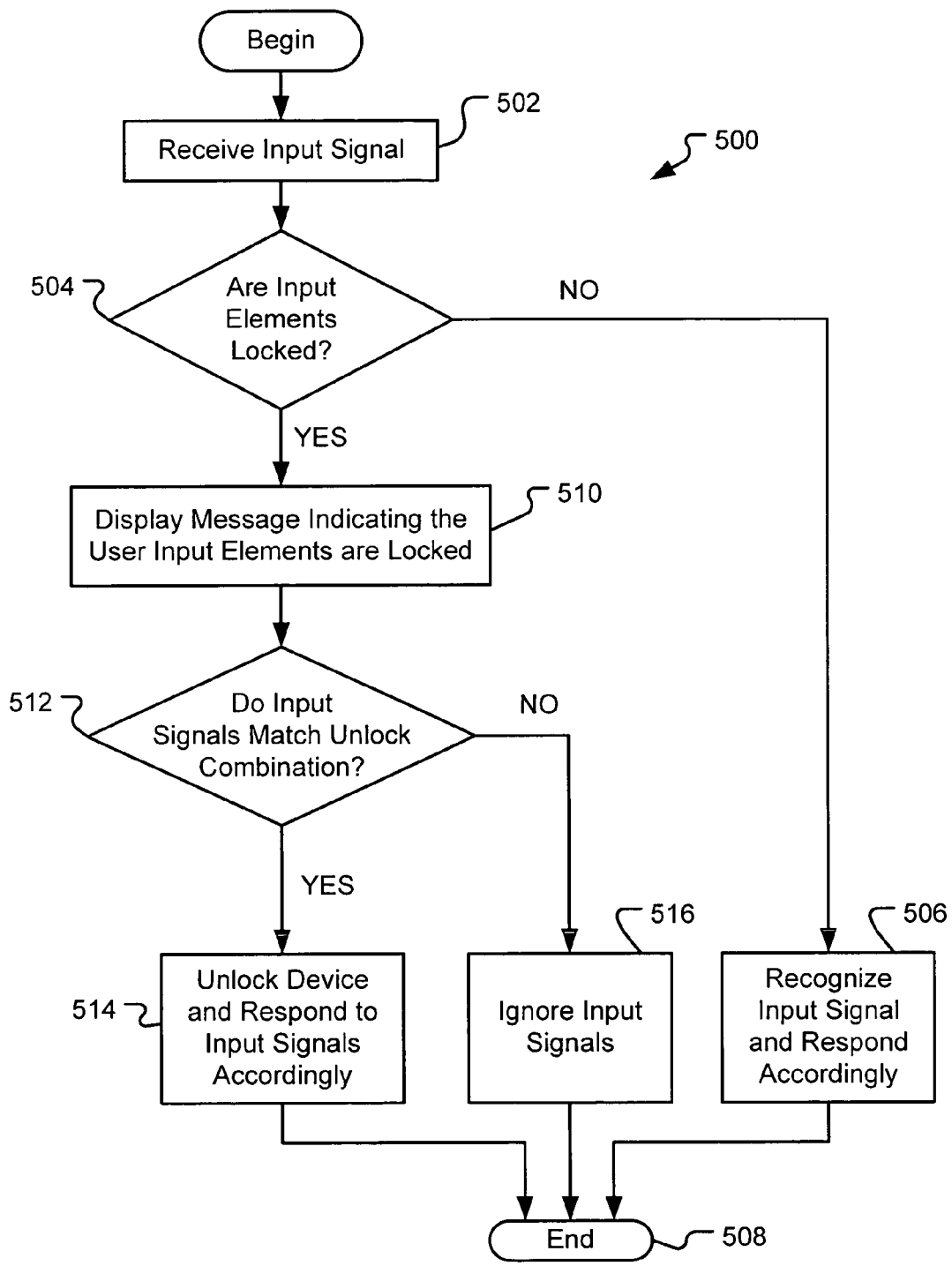
FIG. 5 is a flow diagram showing the operational characteristics of handling an input signal in accordance with the present invention.

FIG. 5 is a flow chart of operational characteristics of the present invention related to the overall handling of input signals in accordance with the present invention. Flow 500 begins as receive operation 502 receives an input signal. An input signal in this case relates to any input signal received from a user interface element, such as the touch screen 102 or input buttons 104 and 106 (shown in FIG. 1).

Once received, test operation 504 determines whether the input elements are locked. Testing whether the input elements are locked involves testing the locked bit or some other flag. If the bit is set, then the input elements are locked, otherwise the device is unlocked. Other methods may be used to test whether the input elements have been locked.

If test operation 504 determines that the input elements are not locked, then flow branches NO to recognize operation 506. Recognize operation 506 recognizes the input signal as an input signal and responds accordingly. Recognizing input signals relates to normal operation of the user interface elements when the device is not locked. As part of the recognition of the input signal, the timer related to the automatic shutdown/sleep module is reset. Additionally, had the input signal been related to locking the device, operation 506 would respond accordingly and lock the device from future input signals. Following the recognition of the input signal, the flow 500 ends at end operation 508.

If test operation 504 determines that the input elements are locked, then flow 500 branches YES to display operation 510. Display operation 510 displays a message to the user that the input elements are locked, or more generally, that the device is locked. Moreover, the message may display instructions as to how the user can unlock the device, e.g., provide the sequence of button presses. Although such a display is quite helpful to a user that is trying to use the device, the act of displaying the message may be omitted in alternative embodiments. That is, since the device essentially wakes up or comes out of sleep mode to display the message, the device may consume more power than necessary if the input signal is an inadvertent signal. One approach may be to display the message only when the power button is pressed for a predetermined period of time.

Following display operation 510, compare operation 512 compares the input signal to determine whether the input signal matches a predetermined combination of input signals to unlock the device. If the input signal matches the predetermined combination of input signals to unlock the device, then flow branches YES to unlock operation 514. Unlocking the device relates to clearing the bit or flag to internally indicate that the device is unlocked and that input signals should be recognized. Additionally, a message may be displayed indicating that the device is unlocked. Following unlock operation 514, flow 500 ends at end operation 508.

The actual input signals relating to unlocking of the user input elements are varied. That is, the device may be configured so that the user may enter an unlock signal by pressing a single button press, by pressing two or more buttons simultaneously, or by consecutively pressing any predetermined combination of button presses. When a combination of button presses are used to conduct the unlock signal, then each consecutive button should be pressed within a predetermined time following the act of pressing previous button. Otherwise, the combination is ignored and the device remains locked. For example, if the unlock signal is generated by consecutively pressing one of the buttons 104 and then pressing button 106, the user must press the button 106 within a predetermined amount of time following the pressing of button 104. Otherwise, the device remains locked. Requiring that the button combination be pressed in order and within a predetermined time interval further ensures that the device does not become inadvertently unlocked.

If compare operation 512 determines that the input signal does not match the predetermined combination of input signals relating to unlocking the device, then flow branches NO to ignore operation 516. Ignore operation 516 ignores the input signal. Ignore operation 516 does not reset the timer associated with the automatic shutdown/sleep module. Following ignore operation 516, flow 500 ends at end operation 508.

The logical operations of the above-described embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

The above-described invention provides the capability to lock user input elements, either manually or automatically to avoid the negative consequences of inadvertent input signals. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of locking user input elements on a small computer device, the method comprising:
   receiving an internally generated locking signal;
   setting a locked flag to indicate the user input elements are locked; and
   ignoring input signals when the locked flag is set,
   wherein the small computer device comprises a calendar-type application program, and
   wherein the internally generated locking signal is generated by the calendar-type application program in response to a predetermined event.

2. The method as defined in claim 1 further comprising:
   determining whether input signals relate to an unlock signal;
   if input signals do not relate to an unlock signal, ignore the input signal; and
   if input signals relate to an unlock signal, unlocking the user input elements.

3. The method as defined in claim 2 wherein button presses create the input signals and wherein the act of determining whether input signals relate to an unlock signal comprises:
   determining whether the button presses occur within a predetermined time period.

4. The method as defined in claim 1 further comprising:
   displaying a message indicating that the user input elements are locked.

5. The method as defined in claim 4 further comprising:
   displaying instructions identifying a predetermined input signal to unlock user interface elements, the instructions viewable by a user such that the user ascertains the appropriate signal to unlock the interface.

6. The method as defined in claim 5 further comprising:
   unlocking the user interface elements with the necessary input signal.

7. The method as defined in claim 1 wherein the small computer device comprises a timer and wherein the internally generated locking signal is generated following a predetermined time interval, the predetermined time interval managed by the timer.

8. The method as defined in claim 7 wherein the predetermined time interval relates to an automatic shutoff/sleep mode time interval.

9. The method as defined in claim 1 wherein the user input element is a touch screen.

10. The method as defined in claim 1 wherein the small computer device comprises a timer used to automatically place the small computer device in sleep mode after a predetermined period of time, the small computer device further comprises calendar-type application program that provides reminder notifications to the user and wherein the small computer device awakes from sleep mode when a reminder occurs during sleep mode; the method further comprising:

ignoring input signals to allow the small computer device to return to sleep mode following a predetermined period of time.

11. A computer system comprising:

user interface input elements;

a processing unit for recognizing user interface input signals; and a locking application for locking the user interface input elements, wherein the processing unit ignores user interface input signals when the user interface input elements are locked and wherein the locking application receives an internally generated lock signal from a calendar-type application.

12. The computer system of claim 11 further comprising a graphical user interface indicating an input signal necessary to unlock the user interface input elements.

13. A computer storage medium readable by a computer device and encoding instructions for executing a computer process for notifying a user of notification events, the process comprising:

receiving an internally generated locking signal;

setting a locked flag to indicate user input elements are locked;

receiving input signals;

testing the locked flag to determine whether it is set; and if the locked flag is set, ignoring input signals, wherein the computer device further comprises a calendar-type application program and wherein the internally generated locking signal is generated by the calendar-type application program in response to a predetermined event.

14. The computer storage medium as defined in claim 13 wherein the process further comprises:

determining whether input signals relate to an unlock signal;

if input signals do not relate to an unlock signal, ignore the input signal and if input signals relate to an unlock signal, unlocking the user input elements.

15. The computer storage medium as defined in claim 13 wherein the process further comprises:

displaying a message indicating that the user input elements are locked.

16. The computer storage medium as defined in claim 13 wherein the computer device comprises a timer and wherein if the internally generated locking signal is not generated by the calendar type application program, the internally generated locking signal is generated following a predetermined time interval, the predetermined time interval managed by the timer.

17. The computer storage medium as defined in claim 16 wherein the predetermined time interval relates to an automatic shutoff/sleep mode time interval.

18. The computer storage medium as defined in claim 13 wherein the user input element is a touch screen.

19. A computer storage medium readable by a computer device and encoding instructions for executing a computer process for notifying a user of notification events wherein the computer device comprises a timer used to automatically place the computer device in sleep mode after a predetermined period of time, the computer device further comprises calendar-type application program that provides reminder notifications to the user and wherein the computer device awakes from sleep mode when a reminder occurs during sleep mode; the process comprising:

receiving an internally generated locking signal;

setting a locked flag to indicate user input elements are locked;

receiving input signals;

testing the locked flag to determine whether it is set; and if the locked flag is set, ignoring input signals to allow the computer device to return to sleep mode following a predetermined period of time.

* * * * *